June 2, 1970

W. V. BAUER 3,515,752

PRODUCTION OF PHOSGENE

Filed Dec. 28, 1965

INVENTOR
William V. Bauer

BY *Marn & Jangarathis*

ATTORNEYS

United States Patent Office 3,515,752
Patented June 2, 1970

3,515,752
PRODUCTION OF PHOSGENE
William V. Bauer, New York, N.Y., assignor to The Lummus Company, New York, N.Y., a corporation of Delaware
Filed Dec. 28, 1965, Ser. No. 516,979
Int. Cl. C07c *51/58*
U.S. Cl. 260—544
5 Claims

ABSTRACT OF THE DISCLOSURE

Process for producing phosgene wherein hydrogen chloride is catalytically oxidized to chlorine and the chlorine reacted with carbon monoxide to produce phosgene. In another embodiment, the chlorine is reacted with sulfur monochloride to produce sulfur dichloride, the sulfur dichloride reacted with carbon monoxide to produce phosgene and sulfur monochloride and the sulfur monochloride recycled to the reaction with chlorine.

---

Figure 1:
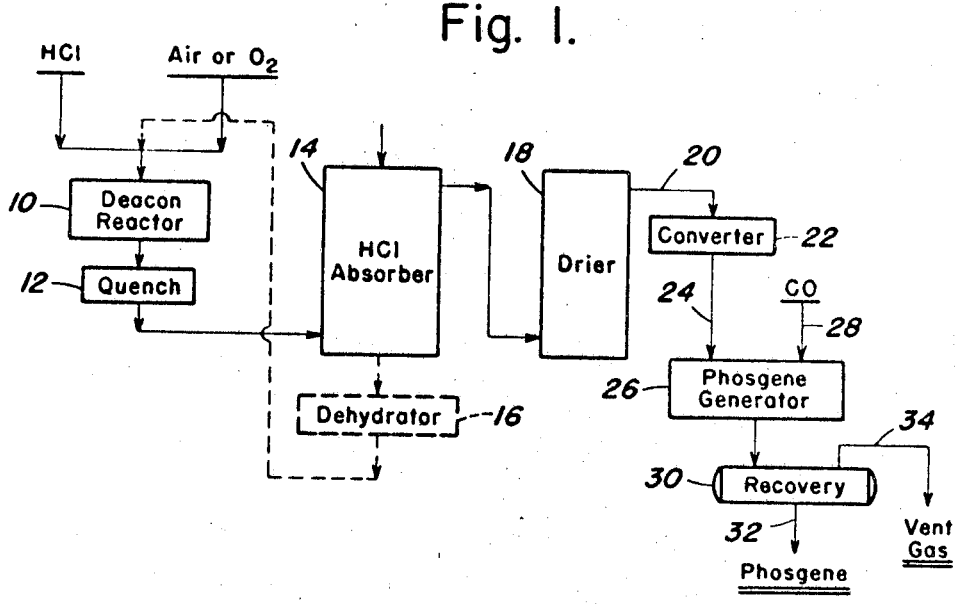

This invention relates generally to a process for the recovery of chlorine from HCl and, more particularly, the invention relates to an improved process wherein the expensive compression or absorption and purification steps associated with conventional processes are eliminated.

Byproduct HCl is formed in many commercial chemical process. Very often, this HCl cannot be disposed of at a value equal to that of the contained chlorine. While much development work has been directed at methods of recovering free chlorine from byproduct HCl, the cost of recovery often equals or exceeds the value of the chlorine, and so the process is uneconomic in these instances.

A typical process which produces large quantities of byproduct HCl is the toluene diisocyanate (or TDI) process. In this process, toluene diamine is dissolved in a suitable solvent and mixed with phosgene in a reactor held at 20°–50° C. The resulting slurry is pumped to a second reactor where it is further reacted with gaseous phosgene at 185° C. Excess phosgene and HCl are vented, and final conversion takes place in a third vessel where an inert gas is blown through the solution at 110°–115° C. The TDI is purified by distillation at 2–5 mm. Hg.

The vented HCl is readly separated from the excess phosgene and, typically, the HCl is sent to a Deacon reactor for oxidation of the HCl according to the following equation:

$$4HCl + O_2 \rightleftharpoons 2CL_2 + 2H_2O \tag{I}$$

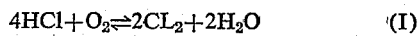

The Deacon process, known for many years, is customarily operated in the range of 275°–375° C. in the presence of a catalyst, typically copper or iron chloride. Promoters such as lead dichloride increase the efficiency of the reaction. The chlorine is stripped from the dried Deacon reactor effluent, concentrated, compressed and passed to a phosgene generator for reuse in the process.

About 35% of the capital cost and as much as 35% of the operating cost in such a chlorine recovery process is taken up by the compression, absorption and purification steps following oxidation and drying. A process which eliminates these steps will materially reduce the cost of chlorine recovery, and the provision of such a process forms a general object of the present invention.

Another object of the present invention is to provide an integrated process for chlorine recovery and generation of phosgene.

Still another object of the present invention is to provide a process for generating phosgene out of byproduct HCl in an efficient and economic manner.

Various other objects and advantages of the invention will become clear from the following detailed description of two embodiments thereof, and the novel features will be particularly pointed out in connection with the appended claims.

In its broadest aspect, the present invention comprises the direct feeding of dried Deacon process gas to a phosgene generator, preferably after contacting the gas with incandescent carbon to convert all $CO_2$ and free oxygen to CO.

A typical byproduct HCl, as is produced in the TDI process, may be oxidized by the Deacon process to yield a gas which, after drying, has the following composition, figures being given for both air and 95% $O_2$ as the oxidizer.

TABLE I.—DRY GAS COMPOSITION

| Component | Gas | |
|---|---|---|
| | Air | 95% $O_2$ |
| $CO_2$ | 0.8 | 2.7 |
| $N_2$ | 69.3 | 3.0 |
| $O_2$ | 3.4 | 3.4 |
| $Cl_2$ | 26.5 | 90.9 |

Inasmuch as the reaction of CO with chlorine proceeds almost to extinction of one or both reactants even when the partial pressure is low, it has been found that it is not necessary to separate, concentrate and compress the chlorine in the stream prior to reaction. Thus, streams of either of the above compositions can be passed directly to a phosgene generator for reaction with additional CO in the presence of a charcoal catalyst according to the following equation:

$$CO + Cl_2 \rightleftharpoons COCl_2 \tag{II}$$

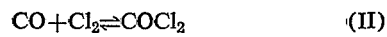

As noted above, passage of the gas over incandescent carbon prior to reaction converts all $CO_2$ and free oxygen to CO, and this step decreases consumption of the charcoal catalyst in the phosgene generator.

One problem inherent in the foregoing embodiment of the invention, particularly where air is the oxidizing agent, is that the phosgene must be separated from other inert gases (phosgene boils at 8° C.) if it is to be recovered in pure form (in some processes, of course, this need not be done). This problem is successfully overcome by the second embodiment of the present invention, wherein the dried Deacon effluent gas is bubbled through liquid sulfur monochloride ($S_2Cl_2$) in a first vessel to form sulfur dichloride ($SCl_2$). The sulfur dichloride is then passed to a second vessel where CO is bubbled through it for reaction according to the following equation:

$$2SCl_2 + CO \rightleftharpoons COCl_2 + S_2Cl_2 \tag{III}$$

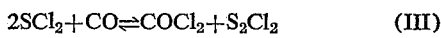

The phosgene passes out of the reactor and the sulfur monochloride is returned to the first vessel for reaction with additional chlorine.

The equilibrium for the reaction:

$$S_2Cl_2 + Cl_2 \rightleftharpoons 2SCl_2 \tag{IV}$$

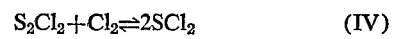

is well known, and this reaction will proceed to the right satisfactorily at temperatures below about 25° C. In general phosgene production can be carried out in the range of 50° to 110° C., and 60° to 100° C. is preferred.

While the two embodiments of the invention are particularly adapted for use in conjunction with a TDI plant, for the obvious reason that such a plant consumes phosgene and produces byproduct HCl, it is to be emphasized that the process finds utility in any plant or industrial area where byproduct HCl is produced and where phosgene is needed.

Figure 2:
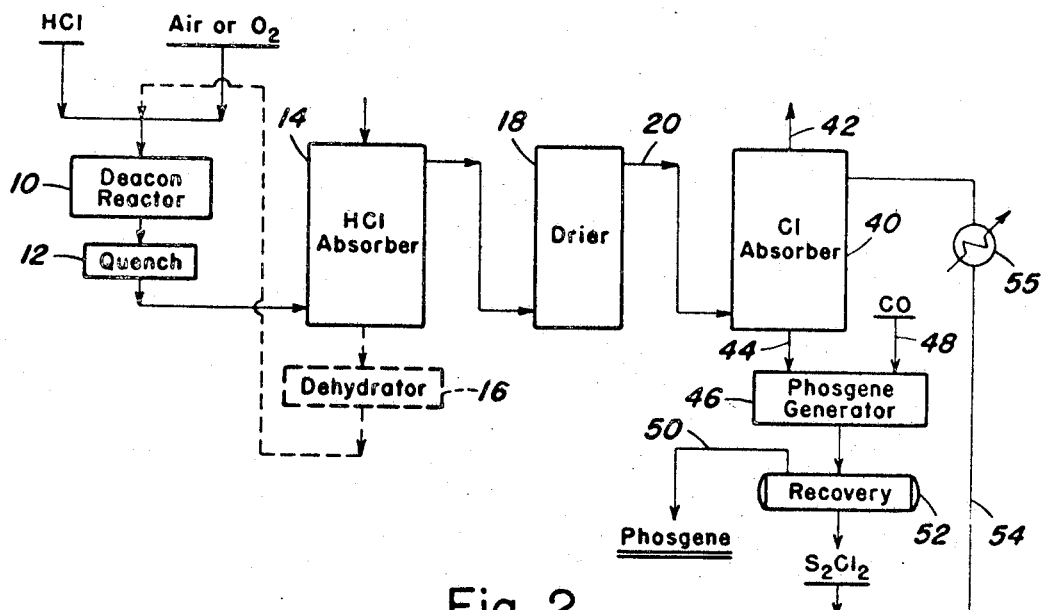

Understanding of the invention will be facilitated by referring to the accompanying drawings and the description thereof set forth hereinbelow. In the drawings:

FIG. 1 is a simplified, schematic flowsheet of a first embodiment of the invention; and FIG. 2 is a simplified, schematic flowsheet of a second embodiment of the invention.

With reference to FIG. 1, it is to be noted that Deacon reator 10, quenching unit 12, HCl absorber 14, optional dehydrator 16 and drier 18 are all process units common to Deacon plants and are operated in accordance with the well-known principles of that process.

Dry gas having a composition shown in Table I depending on whether air or 95% $O_2$ is used) passes from drier 18 in line 20 and preferably passes through converter 22 filled with incandescent carbon, whereby $CO_2$ and $O_2$ are converted to CO. The gas, now rich in chlorine and CO, passes in line 24 to phosgene generator 26, where additional CO is added from line 28. As all reactants and reaction products are in the gaseous state, a recovery step is necessary, and this is carried out in recovery section 30. A simple method of phosgene recovery is to cool the mixture to well below 8° C. and recover the phosgene as a liquid (none of the other gases in the mixture boil at such a high temperature). A higher temperature can be used if the cooling is done under pressure. If this type of separation is employed, recovery section 30 will include a condenser and a knock-out drum. Phosgene is passed in line 32 to storage or directly to use, and other gases are vented via line 34, after scrubbing to remove any residual chlorine.

The alternative embodiment of the invention illustrated in FIG. 2 is identical with the embodiment of FIG. 1 up through drier 18, i.e. the Deacon portion of the process. The dried gas mixture in line 20, again of a composition set forth in Table I, is passed to chlorine absorber 40 where reaction IV takes place, converting $S_2Cl_2$ to $SCl_2$. Unabsorbed gases are vented via line 42, again after scrubbing to remove any residual chlorine.

The sulfur dichloride and any unreacted monochloride pass in line 44 to phosgene generator 46, where CO from line 48 is contacted with the liquid. Reaction III takes place here, producing phosgene. A catalyst such as iron or iron compounds may be used. The phosgene may be removed directly or, as illustrated, it may be taken off via line 50 in a separate recovery section 52. The other reaction product, sulfur monochloride, is recycled via line 54, wherein it is cooled at 55, to chlorine absorber 40.

As a practical matter, it is desirable to continuously circulate a large stoichiometric excess of sulfur chloride through vessels 40, 46 and section 52. The excess is necessary to control temperatures properly. With such an excess of sulfur chloride it is necessary that phosgene generator 46 be designed to promote gas-liquid contact. Temperature of the circulating liquid must be controlled between —78° C., roughly the melting point of both chlorides, and about 150° C. In practice, the higher temperatures are of course preferred, due to kinetics of the reaction. As reaction III is exothermic, this means that either appropriate cooling facilities must be provided in vessel 46, or a cooled recycle stream must be provided.

There is set forth hereinbelow in Table II the required flow of various components in a plant producing 9,880 pounds per hour of phosgene, as produced by the embodiment of FIG. 2.

TABLE II.—MATERIAL FLOW, POUNDS PER HOUR

| Component | Line 20 | Line 54 | Line 42 | Line 44 | Line 50 | Line 48 |
|---|---|---|---|---|---|---|
| $O_2$ | 310 | | 310 | | | |
| $N_2$ | 6,330 | | 6,330 | | | |
| $Cl_2$ | 7,100 | | 15 | | | |
| CO | | | | | | 2,794 |
| $COCl_2$ | | 630 | 10 | 520 | 9,880 | |
| $SCl_2$ | | 60,625 | 65 | 60,560 | | |
| $Cl_2(1)$ | | 375 | | 7,460 | | |

It will be understood that various changes in the details, steps, materials and arrangements of parts, which have herein been described and illustrated in order to explain the nature of the invention, may be made by those skilled in the art within the principle and scope of the invention as defined in the appended claims. For example, it may be preferred to have several reaction zones for chlorine absorption and phosgene generation, so as to improve contact between the reactants.

What is claimed is:

1. Process for producing phosgene from HCl comprising:

catalytically oxidizing said HCl with an oxygen-containing gas and producing thereby a gas mixture comprising chlorine, oxygen, water vapor, nitrogen and carbon dioxide;

removing any unreacted HCl and water vapor from said mixture;

without further treatment contacting said gas mixture with liquid sulfur monochloride, the chlorine in said mixture reacting therewith and converting a portion of said monochloride to sulfur dichloride;

removing said gas mixture, now substantially chlorine-free;

contacting the sulfur dichloride and sulfur monochloride mixture with carbon monoxide, whereby phosgene is generated and sulfur monochloride is regenerated;

recovering said phosgene as product; and recycling said sulfur monochloride to said first contacting step.

2. In a process for the production of phosgene from a dry, free-chlorine containing gas, the improvements comprising:

continuously circulating liquid sulfur monochloride between a first zone and a second zone;

contacting said chlorine-containing gas with said sulfur chloride in said first zone, whereby at least a portion of said sulfur chloride is converted to sulfur dichloride;

contacting said liquid with carbon monoxide in said second zone, whereby phosgene is formed and sulfur monochloride is regenerated; and recovering said phosgene.

3. The process as claimed in claim 2, wherein said contacting of carbon monoxide and said liquid is carried out at a temperature within the range of about 60° to 100° C.

4. The process as claimed in claim 2, wherein a large, stoichiometric excess of sulfur chloride is present in each zone.

5. The process as claimed in claim 2, wherein other components of said chlorine-containing gas are separately removed from said first zone.

References Cited

UNITED STATES PATENTS 1,457,493  1/1922  Bradner _____ 260—544
3,360,483  12/1967  Diamond _____ 23—219

LORRAINE A. WEINBERGER, Primary Examiner

E. J. GLEIMAN, Assistant Examiner

U.S. Cl. X.R.

260—453